US008376840B1

(12) United States Patent
Adiraju et al.

(10) Patent No.: US 8,376,840 B1
(45) Date of Patent: Feb. 19, 2013

(54) PLAYER TRACKING MECHANISM FOR SECONDARY WAGERING GAMES

(75) Inventors: Srinivyasa M. Adiraju, Vernon Hills, IL (US); Daniel P. Louie, Chicago, IL (US); James E. Oatman, Arlington Heights, IL (US); Mark C. Pace, Palatine, IL (US); Erhard W. Rathsack, Reno, NV (US); Craig J. Sylla, Round Lake, IL (US); Matthew J. Ward, Northbrook, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/288,510

(22) Filed: Nov. 3, 2011

Related U.S. Application Data

(60) Provisional application No. 61/409,757, filed on Nov. 3, 2010.

(51) Int. Cl.
*A63F 9/24* (2006.01)
*A63F 13/00* (2006.01)

(52) U.S. Cl. ................. 463/25; 463/16; 463/29; 463/42

(58) Field of Classification Search .............. 463/16–20, 463/25, 29, 40–42; 273/138.1, 139
See application file for complete search history.

(56) References Cited

U.S. PATENT DOCUMENTS 6,142,876 A * 11/2000 Cumbers ......................... 463/25
6,302,793 B1 * 10/2001 Fertitta et al. ................... 463/25
6,722,985 B2 4/2004 Criss-Puszkiewicz et al.
6,908,387 B2 6/2005 Hedrick et al.
7,025,674 B2 * 4/2006 Adams et al. ..................... 463/1
7,112,138 B2 * 9/2006 Hedrick et al. ................. 463/29
7,617,151 B2 * 11/2009 Rowe .............................. 705/39
7,740,538 B2 6/2010 Nguyen et al.
7,909,693 B2 * 3/2011 Kammler et al. ............... 463/25
7,927,212 B2 4/2011 Hedrick et al.
2002/0002075 A1 * 1/2002 Rowe .............................. 463/25
2002/0151359 A1 * 10/2002 Rowe .............................. 463/29
2002/0155887 A1 * 10/2002 Criss-Puszkiewicz et al. . 463/29
2003/0013532 A1 * 1/2003 Rowe et al. ..................... 463/42
2003/0027631 A1 * 2/2003 Hedrick et al. ................. 463/29
2003/0212597 A1 * 11/2003 Ollins ............................. 705/14
2003/0232647 A1 * 12/2003 Moser ............................. 463/29
2004/0092303 A1 * 5/2004 George et al. .................. 463/29
2004/0113360 A1 * 6/2004 George et al. .............. 273/138.1
2004/0259632 A1 * 12/2004 Crittenden et al. ............. 463/25

(Continued)

FOREIGN PATENT DOCUMENTS

WO WO0217251 2/2002
WO WO2005026906 3/2005

(Continued)

*Primary Examiner* — Milap Shah
(74) *Attorney, Agent, or Firm* — DeLizio Gilliam, PLLC

(57) ABSTRACT

A wagering game system and its operations are described herein. In some embodiments, the operations can include monitoring, at a wagering game machine, base wagering game activity associated with one or more base wagering games that are presented during a wagering game session. The operations can also include generating and transmitting one or more activity notification messages comprising at least an indication of the base wagering game activity to a player tracking server to cause the player tracking server to reward the base wagering game activity. The operations can further include generating and transmitting login and logout notification messages to a secondary game server to cause the secondary game server to determine secondary wagering game activity associated with one or more secondary wagering games presented during the wagering game session. The secondary wagering game activity can be used by the player tracking server to reward the secondary wagering game activity.

20 Claims, 8 Drawing Sheets

U.S. PATENT DOCUMENTS

| | | | | |
|---|---|---|---|---|
| 2005/0054439 | A1* | 3/2005 | Rowe et al. | 463/29 |
| 2005/0054446 | A1* | 3/2005 | Kammler et al. | 463/42 |
| 2005/0153768 | A1* | 7/2005 | Paulsen | 463/16 |
| 2005/0153773 | A1* | 7/2005 | Nguyen et al. | 463/25 |
| 2006/0154724 | A1* | 7/2006 | Okuniewicz | 463/29 |
| 2007/0060309 | A1* | 3/2007 | Yankton et al. | 463/25 |
| 2007/0167226 | A1* | 7/2007 | Kelly et al. | 463/29 |
| 2008/0051195 | A1 | 2/2008 | Hedrick et al. | |
| 2008/0224822 | A1* | 9/2008 | Gelman et al. | 340/5.2 |
| 2009/0082109 | A1* | 3/2009 | Sepich et al. | 463/40 |
| 2009/0118002 | A1* | 5/2009 | Lyons et al. | 463/29 |
| 2009/0124373 | A1* | 5/2009 | Acres | 463/29 |
| 2009/0239660 | A1* | 9/2009 | Acres | 463/25 |
| 2009/0270180 | A1 | 10/2009 | Stewart | |
| 2010/0075748 | A1* | 3/2010 | Boesen | 463/29 |
| 2010/0234105 | A1* | 9/2010 | Gagner et al. | 463/30 |

FOREIGN PATENT DOCUMENTS

| | | |
|---|---|---|
| WO | WO2005071630 | 8/2005 |
| WO | WO2006020413 | 2/2006 |
| WO | WO2007124047 | 11/2007 |
| WO | WO2008030955 | 3/2008 |
| WO | WO2010056680 | 5/2010 |
| WO | WO2011044400 | 4/2011 |

* cited by examiner

PLAYER TRACKING MECHANISM FOR SECONDARY WAGERING GAMES

RELATED APPLICATIONS

This application claims the priority benefit of U.S. Provisional Application Ser. No. 61/409,757 filed Nov. 3, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to player tracking for secondary wagering games in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments are illustrated in the Figures of the accompanying drawings in which.

DESCRIPTION OF THE EMBODIMENTS

Figure 1:
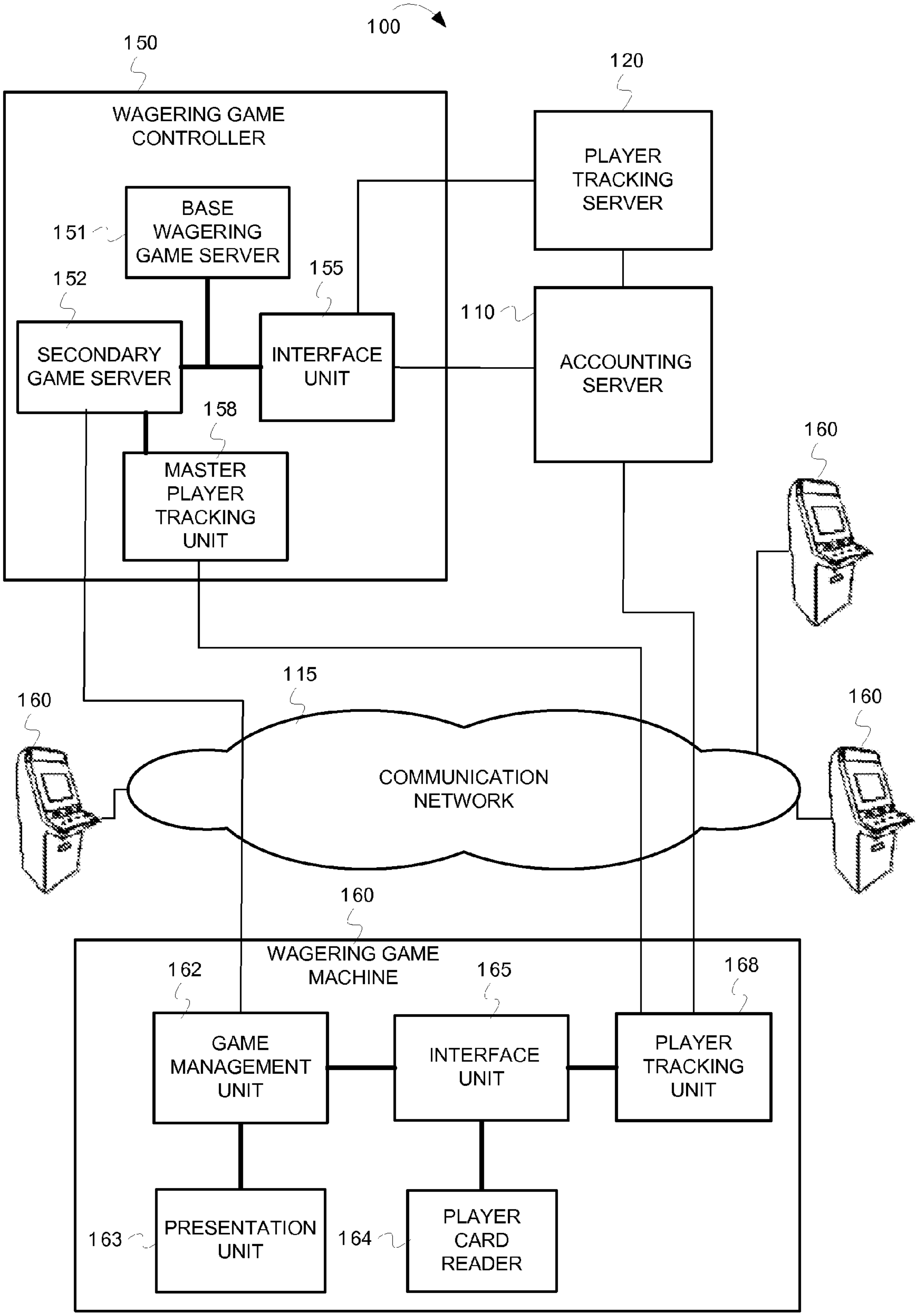
FIG. 1 is a conceptual diagram that illustrates an example of a wagering game system architecture, according to some embodiments.

This description of the embodiments is divided into seven sections. The first section provides an introduction to some embodiments, while the second section describes example wagering game machine architectures, and the third section describes example operations performed by some embodiments. The fourth section describes additional example wagering game machine architectures, and the fifth section describes additional example operations performed by some embodiments. The sixth section describes example wagering game machines in more detail, and the seventh section presents some general comments.

INTRODUCTION

This section provides an introduction to some embodiments.

Operators of gaming establishments (e.g., casino operators) typically track the wagers and wins of players that participate in a wagering game system for accounting purposes and player tracking purposes. The player tracking server of the wagering game system can award player tracking points to players according to the each player's wagering game activity. In one example, the player tracking server can award one player tracking point for each dollar the player wagers. In another example, the player tracking server can award one player tracking point for each dollar the player wagers, and deduct one quarter of a point for each dollar the player wins. Players can redeem player tracking points for casino merchandise, show tickets, hotel stays, etc. Players can also gain status (VIP status) or other recognition from the casino operator based on the total amount of player tracking points the player earns.

The architecture of some wagering game systems is designed such that the player tracking server is only informed of each player's wagering game activity associated with base wagering games, and not informed of each player's wagering game activity associated with secondary wagering games (e.g., bonus games, side games, etc.). Therefore, in these systems, the player tracking server does not award player tracking points to players for their secondary wagering game activity. For instance, in some systems, the base wagering games are run and presented at the wagering game machines, and the secondary wagering games are run remotely from a wagering game server and presented at the wagering game machines. In these systems, the wagering game machines can track each player's base wagering game activity since the base wagering games are run on the wagering game machine, and then report the base wagering game activity to the player tracking server. However, the wagering game machines may not have the intelligence to track each player's secondary wagering game activity, at least in part, because the secondary wagering games are run remotely from the wagering game controller. Furthermore, in these systems, the wagering game controller may not have the intelligence to distinguish between secondary wagering game activities from one player to another, at least in part, because the wagering game controller can service a multitude of wagering game machines in the gaming establishment. In addition to servicing a multitude of wagering game machines, the wagering game machines may not designed to provide information to the wagering game controller that can allow the wagering game controller to separately track the secondary wagering game activity of each player at each wagering game machine.

In some embodiments, a player tracking mechanism can be implemented at each wagering game machine and at the wagering game controller to track each player's secondary wagering game activity so that the player tracking server can also award player points to players based on each player's secondary wagering game activity (in addition to the base wagering game activity). In one embodiment, each wagering game machine can include a player tracking unit (e.g., a player tracking board) configured to provide login and logout notification messages (including timestamps, player identification information, and wagering game machine identification information) to the wagering game controller to enable the wagering game controller to track and determine each player's secondary wagering game activity (and provide the information to the player tracking server), as will be further described below with reference to FIGS. 1-3. Furthermore, additional techniques for implementing player tracking for secondary wagering games will be described below with reference to FIGS. 1-6.

Although some embodiments have been described above, the following sections describe many other features and embodiments.

Operating Environment Examples

This section describes example operating environments and networks and presents structural aspects of some embodiments. More specifically, this section includes discussion about example wagering game system architectures.

Wagering Game System Example Architectures

FIG. 1 is a conceptual diagram that illustrates an example of a wagering game system architecture 100, according to some embodiments. As illustrated, the wagering game system architecture 100 includes an accounting server 110, a player tracking server 120, a wagering game controller 150, and a plurality of wagering game machines 160 connected via a communication network 115. In some embodiments, the wagering game system 100 implements a player tracking mechanism to track the secondary wagering game activity of players to award player tracking points for both base and secondary wagering game activity.

The accounting server 110 is configured to manage and perform accounting operations for the gaming establishment (e.g., casino). For example, all wagering game activity (wagers, wins, etc.) and other money-related activities (e.g., bank transfers) that take place within the gaming establishment are reported to the accounting server 110. In some systems, the accounting server 110 may be referred to as the slot accounting system (SAS) server. The accounting server 110 may also provide auditing capabilities according to regulatory rules. Additionally, the accounting server 110 may manage player accounts associated with the wagering game system 100. As will be further described below, in some implementations, the wagering game machines 160 report all base wagering game activity and the wagering game controller 150 reports all secondary wagering game activity to the accounting server 110 for accounting purposes.

The player tracking server 120 is configured to manage and perform player tracking operations for the gaming establishment. The player tracking server 120 awards player tracking points to players based on the player's wagering game activity (e.g., wagers and wins). As will be further described below, in some embodiments, the wagering game system 100 can implement a player tracking mechanism that not only tracks and reports all the base wagering game activity of players to the player tracking server 120, but also tracks and reports all secondary wagering game activity of players to the player tracking server 120. The player tracking server 120 can monitor and keep a record of each player's base and secondary wagering game activity to award player tracking points to each player. In one example, the player tracking server 120 can award one player tracking point for each dollar the player wagers (in both base and secondary wagering games). In another example, the player tracking server 120 can award one player tracking point for each dollar the player wagers, and deduct one quarter of a point for each dollar the player wins. Players can redeem player tracking points for casino merchandise, show tickets, hotel stays, etc. Players can also gain status (VIP status) or other recognition from the operator of the gaming establishment based on the total amount of player tracking points the player earns.

Each of the wagering game machines 160 are configured to run and present wagering games in one or more displays of the wagering game machine 160, and work in conjunction with the wagering game controller 150, the accounting server 110, and the player tracking server 120 to perform various wagering game system operations. The wagering game machines 160 can include a game management unit 162, a presentation unit 163, a player card reader 164, an interface unit 165, and a player tracking unit 168. The game management unit 162 is configured to run base wagering games to present the base wagering games in one or more displays of the wagering game machine 160. For secondary wagering games that are run at the wagering game controller 150, the game management unit 162 is configured to work in conjunction with the wagering game controller 150 to present secondary wagering games at the wagering game machine 160. Furthermore, the game management unit 162 can generate game results based on random numbers generated at the wagering game machine 160, can generate game results based on random numbers received from the wagering game controller 150, or may communicate with the wagering game controller 150 to obtain the game results. The presentation unit 163 is configured to work in conjunction with the game management unit 162 to control the presentation of the base and secondary game content on the wagering game machine 160. The presentation unit 163 can include one or more browsers and any other software and/or hardware suitable for presenting audio and video content. It is noted, however, that in other implementations the game content can be presented using other display technologies.

The player card reader 164 is configured to detect when a player card is inserted into (or removed from) the player card reader 164, and provide the player card identification number associated with the player card to the interface unit 165. The interface unit 165 can obtain the player card identification number from the player card reader 164. The interface unit 165 is configured to send base game card-in/card-out notification messages (e.g., via the player tracking unit 168) to the accounting server 110 and the player tracking server 120 for accounting and player tracking of base wagering games, as will be further described below with reference to FIGS. 2-3. The base game card-in/card-out notification messages can include at least an indication that the player card was received/removed, the player card identification number ("player card ID"), start/end meter readings associated with the base wagering games, the wagering game machine identification number ("wagering game machine ID") associated with the corresponding wagering game machine 160, and a timestamp. The player tracking unit 168 is configured to detect base game card-in/card-out notification messages from the interface unit 165, and forward the base game card-in/card-out notification messages to the accounting server 110 and the player tracking server 120. In response to detecting the base game card-in/card-out notification messages, the player tracking unit 168 is further configured to provide secondary game card-in/card-out notification messages to the wagering game controller 150 to allow the wagering game controller 150 to track secondary wagering game activity of players, which can be used by the player tracking server 120 for player tracking purposes, as will be further described below with reference to FIGS. 2-3. The secondary game card-in/card-out notification messages can include at least an indication that the player card was received/removed, the player card ID, the wagering game machine ID, and the same timestamp. In some embodiments, the player tracking unit 168 can be implemented in hardware and software in a player tracking board within the wagering game machine 160. In one example, the player tracking board can be part of the same subsystem within the wagering game machine 160 that includes the interface unit 165 and the game management unit 162. In another example, the player tracking board can be a separate subsystem within the wagering game machine 160 (e.g., with a separate CPU, memory, etc.) that is coupled to at least the interface unit 165. In another example, the player tracking board can be a separate subsystem that is external to the wagering game machine 160 or attached to the cabinet or housing of the wagering game machine 160 (and coupled to at least the interface unit 165). In some implementations, the player tracking unit 168 can be implemented in software within the wagering game machine 160. Similar to the player tracking unit 168, in some embodiments, the interface unit 165 can be implemented in hardware and software in an interface board within the wagering game machine 160. In some example systems, the interface board of the wagering game machine 160 may be referred to as the slot machine interface board (SMIB). In some embodiments, the interface unit 165 can be implemented in software within the wagering game machine. It is noted, however, that in other embodiments the player tracking unit 168 and/or the interface unit 165 can be implemented within the wagering game machine 160 by other techniques; for example, the player tracking unit 168 and/or the interface unit 165 can be implemented within a common circuit board as other components of the wagering game machine 160.

The wagering game machines 160 described herein can take any suitable form, such as floor standing models, handheld mobile units, bar-top models, workstation-type console models, surface computing machines, etc., and can access the communication network 115 to communication with the wagering game controller 150 via a wireless or wired connection. In some embodiments, each of the wagering game machines 160 and the wagering game controller 150 are configured to work together such that the wagering game machine 160 can be operated as a thin, thick, or intermediate client. For example, one or more elements of game play may be controlled by the wagering game machine 160 (client) or the wagering game controller 150 (server). Game play elements can include executable game code, lookup tables, configuration files, game results, audio or visual representations of the game, game assets or the like. In a thin-client example, the wagering game controller 150 can perform functions such as determining game results or managing assets, while the wagering game machine 160 can present an audible/graphical representation of such outcome or asset modification to the players. In a thick-client example, the wagering game machine 160 can run the wagering games and determine game outcomes and communicate wagering game activity to the wagering game controller 150, the accounting server 110, and/or the player tracking server 120 for recording or managing a player's wagering game system account, player tracking, various accounting operations, etc.

The wagering game controller 150 is configured to perform various operations for the wagering game system 100. For example, the wagering game controller 150 can include a base wagering game server 151 for storing base wagering game content, providing base wagering game updates to the wagering game machines 160, and providing new base wagering games to the wagering game machines 160. In some implementations, the base wagering game server 151 can also generate random numbers and provide the random numbers to the wagering game machines 160 so that the wagering game machines can determine game results for base wagering games. The wagering game controller 150 can also include a secondary game server 152 configured to run secondary wagering games, and work in conjunction with the game management unit 162 of the wagering game machines 160 to present the secondary wagering games in one or more displays of the wagering game machines 160. For example, the secondary game server 152 can receive bonus trigger notification messages from the wagering game machines 160 that indicate that a bonus game should be presented at the corresponding wagering game machines 160. The secondary game server 152 may also be configured to create and manage systemwide, cumulative secondary wagering game activity records based on secondary wagering game activity messages received from the game management unit 162 of the wagering game machines 160, and provide the cumulative records to the accounting server 110 for accounting purposes. For example, the secondary game server 152 can maintain secondary game meters to track the secondary wagering game activity. Furthermore, the secondary game server 152 can also receive secondary game card-in/card-out notification messages from a master player tracking unit 158 that allows the secondary game server 152 to track and generate records of the secondary wagering game activity of each individual player, which can be forwarded to the player tracking server 120 for player tracking purposes, as will be further described below with reference to FIGS. 2-3. Although not show in FIG. 1, the master player tracking unit 158 may be connected to the player tracking units 168 of each of the wagering game machines 160 (e.g., via an Ethernet connection) that implement the player tracking mechanism described herein. The master player tracking unit 158 is configured to receive the secondary card-in/card-out notification messages from the player tracking units 168 of each of the wagering game machines 160 and forward the information to the secondary game server 152 for further processing. The wagering game controller 150 also includes an interface unit 155 configured to forward the systemwide, cumulative secondary wagering game activity records directly to the accounting server 110, and forward the secondary wagering game activity records of individual players directly to the player tracking server 110, as will be further described below. Similarly to the client player tracking units 168, in some embodiments, the master player tracking unit 158 can be implemented in hardware and software in a master player tracking board within the wagering game controller 150. In some implementations, the master player tracking unit 158 can be implemented in software within the wagering game controller 150. Also, similar to the master player tracking unit 158, in some embodiments, the interface unit 155 can be implemented in hardware and software in an interface board within the wagering game controller 150. In some example systems, the interface board of the wagering game controller 150 may be referred to as the slot machine interface board (SMIB). In some embodiments, the interface unit 155 can be implemented in software within the wagering game controller 150. In some system implementations, the accounting server 110 and the player tracking server 120 may implement a proprietary protocol, and therefore the interface units 165 of the wagering game machines 160 and the interface unit 155 of the wagering game controller 150 can also perform the necessary protocol conversions to enable the network communications between the different network entities. It is noted that although FIG. 1 (and some of the examples described herein and in the additional Figures below) may imply that some network connections are wired, in some embodiments some or all of the network connections between the different entities of the wagering game system 100 may be implemented wirelessly.

Each component shown in the wagering game system architecture 100 is shown as a separate and distinct element connected via the communications network 115. However, some functions performed by one component could be performed by other components. For example, the base wagering game server 151 can be configured to perform some or all of the functions of the secondary game server 152. Furthermore, the components shown may all be contained in one device, but some, or all, may be included in, or performed by multiple devices, as in the configurations shown in FIG. 1 or other configurations not shown, e.g., the functionality of the master player tracking unit 158 can be integrated within the secondary game server 152, and/or the accounting server 110 and the player tracking server 120 may be implemented within a single server system. Furthermore, the wagering game system architecture 100 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game table, machine, computer, etc.). For example, tangible machine-readable storage media includes read only memory (ROM), random access memory (RAM), magnetic disk storage media, optical storage media, flash memory machines, and other types of tangible medium suitable for storing instructions. Machine-readable transmission media includes any media suitable for transmitting software over a network.

Although FIG. 1 describes some embodiments, the following sections describe many other features and embodiments.

Example Operations

This section describes operations associated with some embodiments. In the discussion below, the flow diagrams will be described with reference to the block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 2:
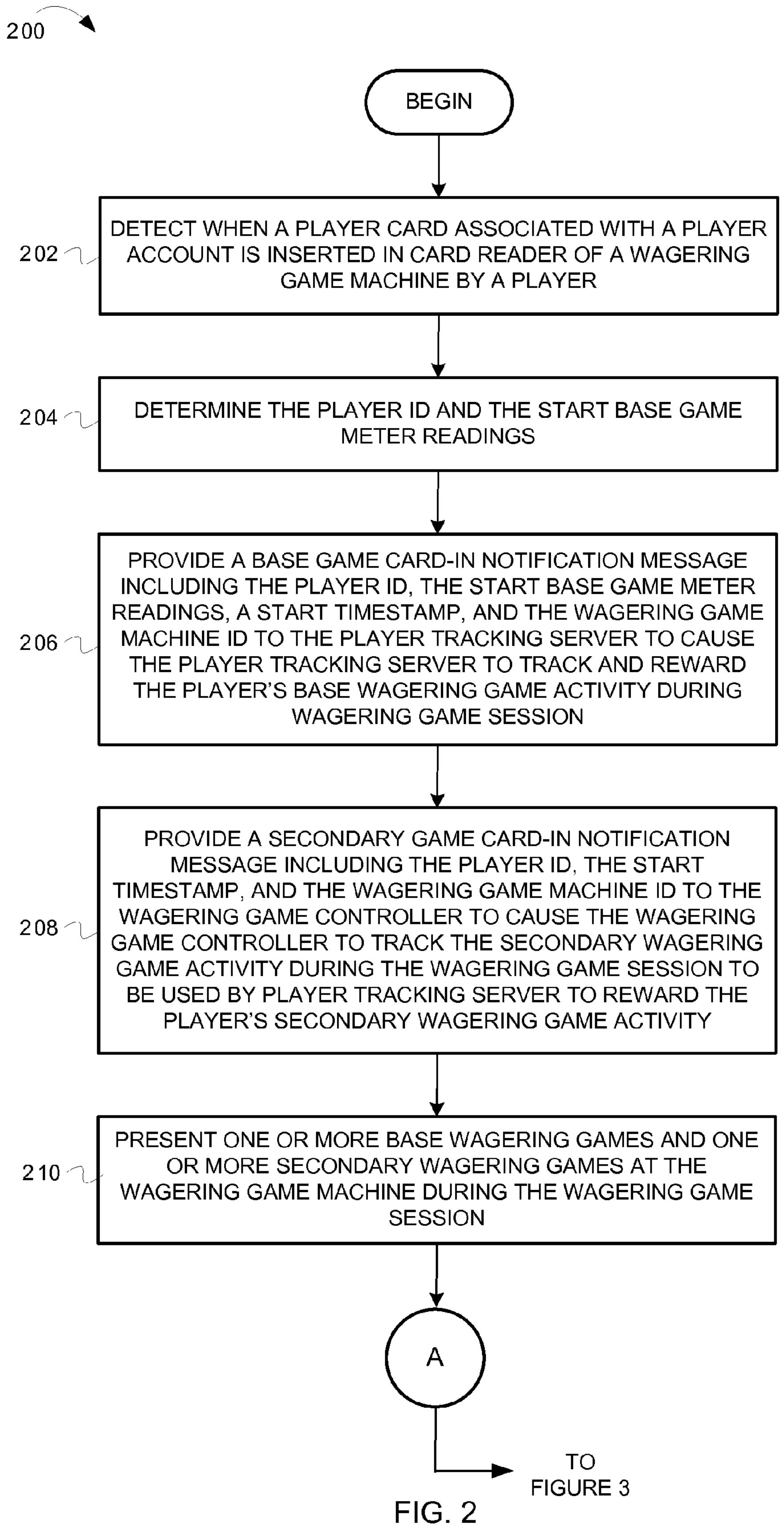
FIG. 2 is a flow diagram illustrating operations for implementing player tracking for secondary wagering games in a wagering game system, according to some embodiments.
Figure 3:
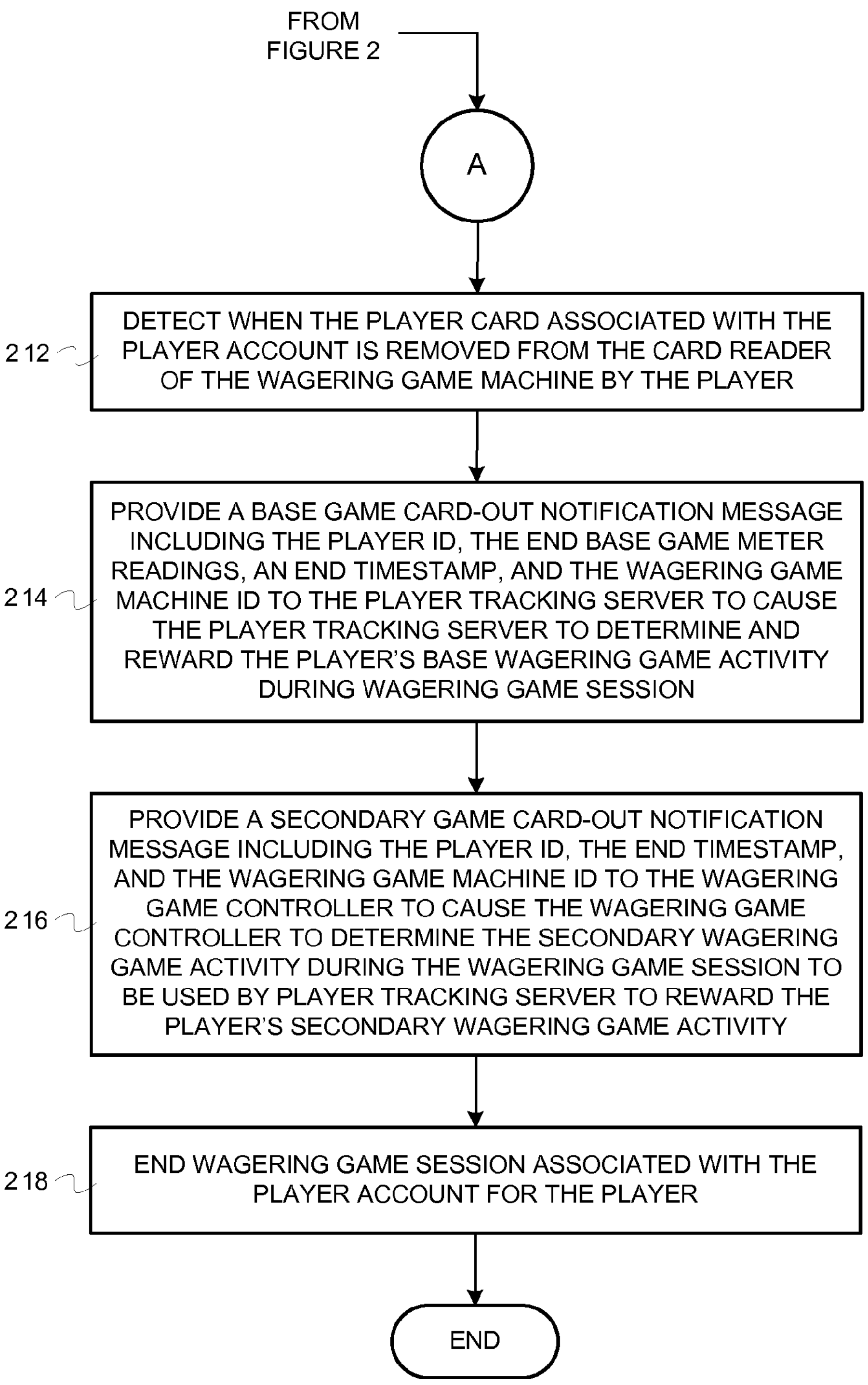
FIG. 3 is a flow diagram illustrating additional example operations for implementing player tracking for secondary wagering games in a wagering game system, according to some embodiments.

The following discussion of FIGS. 2-3 will describe various examples of player tracking of secondary wagering game activity using a player tracking unit (e.g., a player tracking board) at the wagering game machines.

FIG. 2 is a flow diagram ("flow") 200 illustrating operations for implementing player tracking for secondary wagering games in a wagering game system, according to some embodiments. The flow of 200 will be described with reference to the example system architecture of FIG. 1. The flow diagram begins at block 202.

At block 202, a wagering game machine 160 detects when a player card associated with a player account is inserted into a player card reader 164 of the wagering game machine 160 by a player. In one implementation, the player card reader 164 can detect the player card and read the player card ID. The player card reader 164 can then verify that the player card ID is compatible or supported by the wagering game system 100. The player card reader 164 can then provide a visual indication to the player whether the player card has been accepted or rejected (and may also eject the player card if rejected). It is noted, however, that in some embodiments the player card ID, or another player identification number ("player ID") associated with the player account of the player, can be determined depending on the method the player uses to login to the wagering game machine 160. For example, the player can login to the wagering game machine 160 using a username and password, and the wagering game machine 160 can use the username, or a combination of the username and the password, as the player ID. In another example, the player can login to the wagering game machine 160 using biometrics, and the wagering game machine 160 can use a biometric code as the player ID. Regardless of the manner the player uses to login, the wagering game machine 160 can detect a player ID associated with the player account of the player. In some cases, the player ID may be the player account number, or the player card ID. After block 202, the flow continues at block 204.

At block 204, the wagering game machine 160 determines the player ID associated with the player account, and the start base game meter readings. In one implementation, the interface unit 165 can obtain the player ID from the player card reader 164, and the start base game meter readings from the game management unit 162. The base game management unit 162 can implement base game meters to track the base wagering game activity during each wagering game session. For example, the base game management unit 162 can implement a base game wager meter to track the wagers associated with the base wagering game, and a base game win meter to track the wins associated with the base wagering game. The base game management unit 162 can also implement other base game meters for other purposes. In one implementation, the interface unit 165 can obtain the start readings associated with both the base game wager meter and the base game win meter. After block 204, the flow continues at block 206.

At block 206, the wagering game machine 160 provides a base game card-in notification message including the player ID, the start (or card-in) base game meter readings, a start (or card-in) timestamp, and the wagering game machine ID to the player tracking server 120 to cause the player tracking server 120 to track and reward (e.g., with player tracking points) base wagering game activity during the wagering game session. In one implementation, the interface unit 165 can provide the base game card-in notification message to the player tracking unit 168, which forwards the card-in notification message to both the accounting server 110 for accounting purposes and to the player tracking server 120 for player tracking purposes. In one implementation, the accounting server 110 forwards the base game card-in notification message to the player tracking server 120. In another implementation, the interface unit 165 provides the base game card-in notification message directly to the accounting server 110, and also to the player tracking unit 168. It is noted, however, that in other implementations the player tracking unit 168 can detect the base game card-in notification message by other methods. For example, the interface unit 165 can provide the base game card-in notification message directly to the accounting server 110, and the player tracking unit 168 can intercept or snoop all messages sent by the interface unit 165 to detect all base game card-in notification messages.

The player tracking server 120 can use the information in the base game card-in notification message to create a player tracking record for the player account associated with the player ID and the wagering game machine ID. The player tracking server 120 can determine the base game wagering game activity associated with the player for the player tracking record based on the start base game meter readings and the timestamp associated with the start of the wagering game session, and also information that will be included in a card-out notification message, as will be further described below. After block 206, the flow continues at block 208.

At block 208, the wagering game machine 160 provides a secondary game card-in notification message including the player ID, the start (or card-in) timestamp, and the wagering game machine ID to the wagering game controller 150 to cause the wagering game controller 150 to track the secondary wagering game activity associated with the player account during the wagering game session. The wagering game controller 150 can then provide an indication of the secondary wagering game activity associated with the player account to the player tracking server 120 for rewarding (e.g., with player tracking points) the player's secondary wagering game activity. In one implementation, the player tracking unit 168 can detect the player ID and the wagering game machine ID of the base game card-in notification message and use this information to generate the secondary game card-in notification message. The player tracking unit 168 can provide the secondary game card-in notification message to the wagering game controller 150 to allow the wagering game controller 150 to track the player's secondary wagering game activity during the wagering game session. In some system implementations, the wagering game controller 150 receives information that indicates the secondary wagering game activity across the wagering game machines 160 based on the wagering game IDs (which can be forwarded to the accounting server 110 for accounting purposes), but the wagering game controller 150 may not have the capability to track each individual player's secondary wagering game activity without the information provided within the secondary game card-in notification message.

In some embodiments, the wagering game controller 150 can receive the secondary game card-in notification message and create a player tracking record to track the player's secondary wagering game activity based on the player ID, the timestamp, and the wagering game machine ID. For example, to create the player tracking record, the wagering game controller 150 can begin tracking the secondary wagering game activity that takes place after the timestamp (included in the secondary game card-in notification) at the wagering game machine 160 associated with the wagering game machine ID and associate this secondary wagering game activity to the player ID. In one implementation, the secondary game server 152 of the wagering game controller 150 can maintain secondary game meters that track the secondary wagering game activity at each wagering game machine 160 (based on the wagering game machine ID). For example, the secondary game server 152 can maintain a secondary game wager meter that tracks the secondary game wagers that are placed at the wagering game machine 160, and a secondary game win meter that tracks the secondary game wins that take place at the wagering game machine 160. In some embodiments, in response to receiving the secondary game card-in notification message, the wagering game controller 150 can store the start (or card-in) secondary game meter readings in the player tracking record that is created for the player account to track the player's secondary wagering game activity. As will be further described below, the player tracking record for the player's secondary wagering game activity would be closed or completed based on the information received in the secondary game card-out notification message (e.g., the card-out timestamp). Sometime after completing the player tracking record for the player's secondary wagering game activity, the wagering game controller 150 can provide the player tracking record directly to the player tracking server 120 to reward the player's secondary wagering game activity. After block 208, the flow continues at block 210.

At block 210, the wagering game machine 160 presents one or more base wagering games and one or more secondary wagering games during the wagering game session. In some implementations, during the wagering game session, the game management unit 162 updates the base game meters based on the base wagering game activity (e.g., the wagers and wins). For example, the game management unit 162 updates the base game wager meter according to the player's wagers and updates the base game win meter according to the player's wins (if any). In some implementations, the game management unit 162 also provides an indication of the wagers the player places for secondary wagering games and the wagering game machine ID to the wagering game controller 150. Since the secondary wagering games are run at the secondary game server 152 of the wagering game controller 150, the secondary game server 152 tracks the wins associated with the secondary wagering games that are presented at the wagering game machine 160. After block 210, the flow continues at block 212 of FIG. 3.

FIG. 3 is a flow diagram illustrating additional example operations for implementing player tracking for secondary wagering games in a wagering game system, according to some embodiments. The flow diagram of FIG. 3 is a continuation of the flow diagram shown in FIG. 2, and begins at block 212.

At block 212, the wagering game machine 160 detects when the player card associated with the player account is removed from the player card reader 164 of the wagering game machine 160 by the player. As described above, the player can login to the wagering game machine 160 by various methods that do not involve a player card. For example, the player can logout from the wagering game machine 160 by clicking an icon on a graphical user interface, or by pressing a physical button on a panel of the wagering game machine 160. In another example, the wagering game machine 160 can logout the player based on inactivity, or using machine vision and detecting that the player is no longer at the wagering game machine 160. Regardless of the manner the player logs out, the wagering game machine 160 can detect that the player associated with the player ID has logged out from the wagering game machine 160. After block 212, the flow continues at block 214.

At block 214, the wagering game machine 160 provides a base game card-out notification message including the player ID, the end (or card-out) base game meter readings, an end (or card-out) timestamp, and the wagering game machine ID to the player tracking server 120 to cause the player tracking server 120 to determine and reward (e.g., with player tracking points) base wagering game activity during the wagering game session. Similarly as was described above for the card-in notification message, in one implementation, the interface unit 165 can provide the base game card-out notification message to the player tracking unit 168, which forwards the card-out notification message to both the accounting server 110 for accounting purposes and to the player tracking server 120 for player tracking purposes. In one implementation, the accounting server 110 forwards the base game card-out notification message to the player tracking server 120. In another implementation, the interface unit 165 provides the base game card-out notification message directly to the accounting server 110, and also to the player tracking unit 168. It is noted, however, that in other implementations the player tracking unit 168 can detect the base game card-out notification message by other methods. For example, the interface unit 165 can provide the base game card-out notification message directly to the accounting server 110, and the player tracking unit 168 can intercept or snoop all messages sent by the interface unit 165 to detect all base game card-out notification messages.

The player tracking server 120 can use the information in the base game card-out notification message to close or complete the player tracking record that was created in response to the base game card-in notification message for the player account associated with the player ID and the wagering game machine ID. The player tracking server 120 can determine the base game wagering game activity associated with the player for the player tracking record based on the difference between the start and end base game meter readings and the timestamps associated with the start and end of the wagering game session. For example, the player tracking server 120 can determine the difference between the start and end base game wager meter readings to determine the amount the player wagered during the wagering game session. In some implementations, the player tracking server 120 can also determine the difference between the start and end base game win meter readings to determine the amount the player won during the wagering game session. The player tracking server 120 may also analyze other base game meter readings that may have been included in the base game card-in/card-out notification messages for player tracking purposes. After determining the player's base game wagering game activity (e.g., the wager amount and the win amount) during the wagering game session, the player tracking server 120 can update the player tracking record associated with the player account of the player to indicate the player's base game wagering game activity. The player tracking server 120 may then award player tracking points to the player account of the player based on the player's base game wagering game activity. After block 214, the flow continues at block 216.

At block 216, the wagering game machine 160 provides a secondary game card-out notification message including the player ID, the end (or card-out) timestamp, and the wagering game machine ID to the wagering game controller 150 to cause the wagering game controller 150 to determine the secondary wagering game activity associated with the player account during the wagering game session. The wagering game controller 150 can then provide an indication of the secondary wagering game activity associated with the player account to the player tracking server 120 for rewarding the player's secondary wagering game activity. In one implementation, the player tracking unit 168 can detect the player ID and the wagering game machine ID of the card-out base game notification message and use this information to generate the secondary game card-out notification message. The player tracking unit 168 can provide the secondary game card-out notification message to the wagering game controller 150 to allow the wagering game controller 150 to track the player's secondary wagering game activity during the wagering game session.

In some embodiments, the wagering game controller 150 can receive the secondary game card-out notification message and can close or complete the player tracking record that was created based on the secondary game card-in notification message (according to the card-in timestamp, the start secondary game meter readings, the wagering game machine ID and the player ID). The secondary game server 152 can determine the player's secondary wagering game activity during the wagering game session for the player tracking record based on the secondary game card-out notification message. In one implementation, the secondary game server 152 can determine the end (or card-out) secondary game meter readings associated with the wagering game machine ID based on the card-out timestamp. Then, the secondary game server 152 can determine the secondary game wagering game activity associated with the player for the player tracking record based on the difference between the start and end secondary game meter readings that were recorded based on the start/end timestamps associated with the start/end of the wagering game session. For example, the secondary game server 152 can determine the difference between the start/end secondary game wager meter readings to determine the amount the player wagered for secondary wagering games during the wagering game session. In some implementations, the secondary game server 152 can also determine the difference between the start/end secondary game win meter readings to determine the amount the player won for the secondary wagering games during the wagering game session. The secondary game server 152 may also analyze other secondary game meter readings that may be maintained at the secondary game server 152 for player tracking purposes. Sometime after completing the player tracking record for the player's secondary wagering game activity, the wagering game controller 150 can provide the player tracking record directly to the player tracking server 120 to reward the player's secondary wagering game activity. The player tracking server 120 may then award player tracking points to the player account of the player (associated with the player ID) based on the player's secondary wagering game activity included in the player tracking record. After block 216, the flow continues at block 218.

At block 218, the wagering game machine 160 ends the wagering game session associated with the player account of the player. After block 218, the flow ends.

In some embodiments, instead of providing base game card-in/card-out notification messages to the accounting server 110 and the player tracking server 120, the interface unit 165 may perform the operations described above for creating and completing the player tracking record for the player's base wagering game activity. For example, the interface unit 165 can determine the difference between the start and end base game meter readings to determine the base wagering game activity (e.g., the wager amount and the win amount). After completing the player tracking record, the interface unit 165 can then send a base game activity notification message to the accounting server 110 and the player tracking server 120 that includes an indication of the base wagering game activity, the wagering game machine ID, and the player ID. In some cases, the base game activity notification message may also include the start/end timestamps and/or the start/end base game meter readings. In these embodiments, the player tracking unit 168 can obtain the necessary information (e.g., start/end timestamps, wagering game machine ID, and the player ID) from the interface unit 165 so that the player tracking unit 168 can still send out the secondary game card-in/card-out notification messages to the wagering game controller to track the player's secondary wagering game activity.

In some embodiments, instead of the wagering game controller 150 providing the player tracking records associated with the player's secondary wagering game activity to the player tracking server 120 so that the player tracking server 120 can determine how many player tracking points to award to the player account associated with the player, the secondary game server 152 can determine how many player tracking points the player has earned based on the secondary wagering game activity. In one implementation, the secondary wagering game server 152 can be programmed with the player tracking award algorithm to allow the wagering game server 152 to determine the number of player tracking points to award the player account. After determining the number of player tracking points that correspond to the player's secondary wagering game activity, the secondary game server 152 can provide an indication of the number of tracking points to award the player account to the player tracking server 152. The player tracking server 152 can then credit the player account of the player with the indicated number of player tracking points.

In some embodiment, instead of including a master player tracking unit 158 at the wagering game controller 150, the functionality associated with the master player tracking unit 158 can be included within the secondary game server 152. In these embodiments, the player tracking units 168 of each of the plurality of wagering game machines 160 can communication directly with the secondary game server 152 of the wagering game controller 150.

It is noted that although the base game and secondary game notification messages are referred to above as card-in/card-out notification messages, in some system implementations the player may login at and logout from the wagering game machine 160 by various other methods that do not involve a player card (e.g., username/password, biometric, account number, or some combination), as was described above. Therefore, it is noted that the card-in/card-out notification messages can be more generally referred to as login/logout notification messages.

Additional Operating Environment Examples

This section describes additional example operating environments and networks and presents structural aspects of some embodiments. More specifically, this section includes discussion about additional examples of wagering game system architectures.

Additional Wagering Game System Example Architectures

Figure 4:
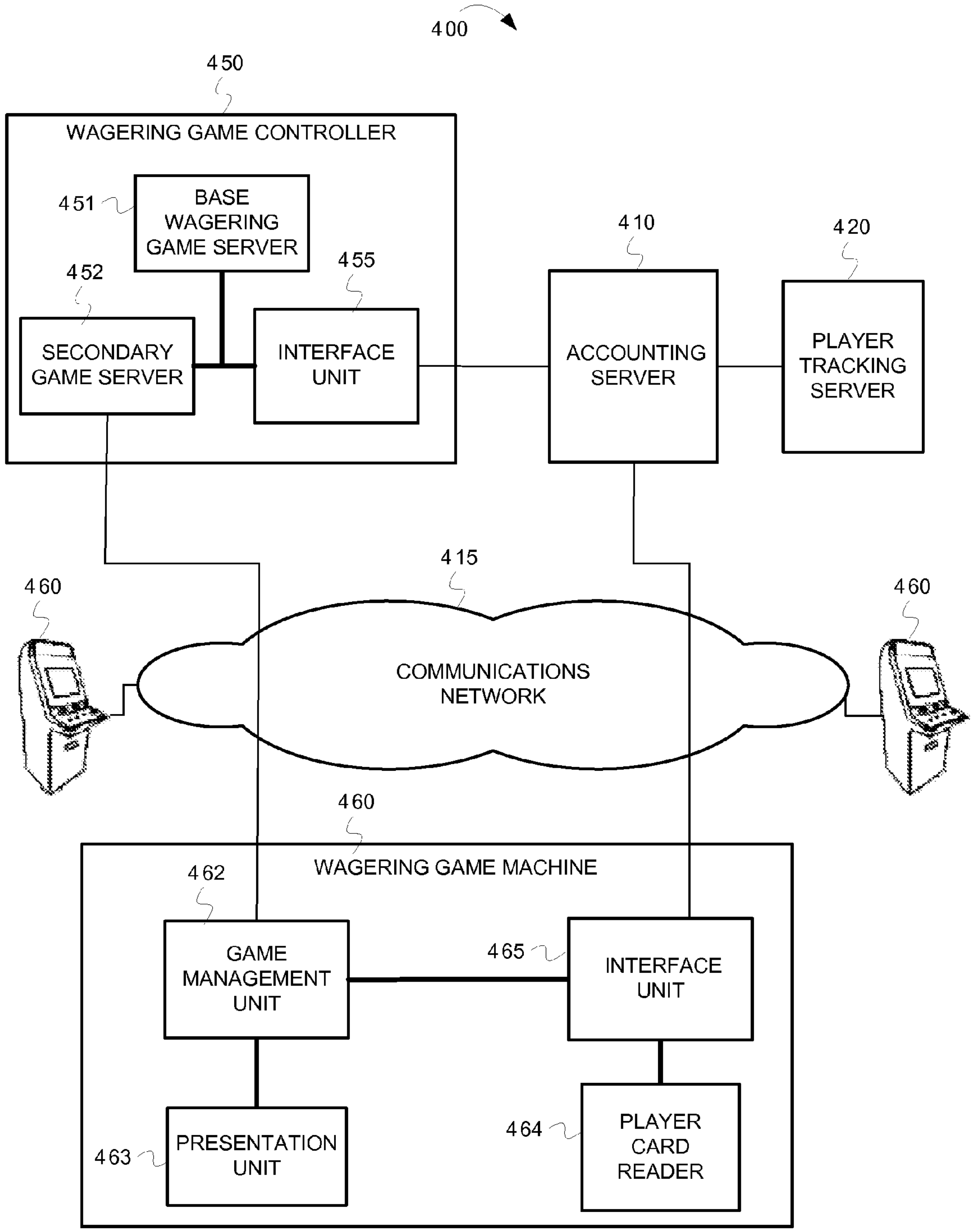
FIG. 4 is a conceptual diagram that illustrates another example of a wagering game system architecture, according to some embodiments.

FIG. 4 is a conceptual diagram that illustrates another example of a wagering game system architecture 400, according to some embodiments. As illustrated, the wagering game system architecture 400 includes an accounting server 410, a player tracking server 420, a wagering game controller 450, and a plurality of wagering game machines 460 connected via a communication network 415. In some embodiments, the wagering game system 400 implements a player tracking mechanism to track the secondary wagering game activity of players to award player tracking points for both base and secondary wagering game activity.

Similar to the wagering game system 100 of FIG. 1, the accounting server 410 is configured to manage and perform accounting operations, and the player tracking server 420 is configured to manage and perform player tracking operations for the gaming establishment (e.g., casino). Also, each of the wagering game machines 460 are configured to run and present wagering games in one or more displays of the wagering game machine 460, and work in conjunction with the wagering game controller 450, the accounting server 410, and the player tracking server 420 to perform various wagering game system operations.

As illustrated in FIG. 4, the wagering game machines 460 can include a game management unit 462, a presentation unit 463, a player card reader 464, and an interface unit 465. The game management unit 462, the presentation unit 463, and the player card reader 464 of each wagering game machine 460 may be configured to perform the same operations as described above with reference to FIG. 1, with the exception of the operations related to the player tracking unit 168 of FIG. 1 (since the wagering game machines 460 do not include a player tracking unit). The interface unit 465 can work in conjunction with the game management unit 462 to provide both an indication of the base wagering game activity and the secondary wagering game activity to the accounting server 410 and the player tracking server 420. In one embodiment, the interface unit 465 can obtain the start/end base game meter readings from the game management unit 462 to determine a player's base wagering game activity during a wagering game session. The interface unit 465 can also obtain an indication of secondary wagering game wagers and wins from the game management unit 462, as will be further described below with reference to FIGS. 5-6. In some implementations, instead of the interface unit 465 calculating the difference between the start/end base game meter readings, the interface unit 465 can provide the start/end base game meter readings to the accounting server 410 and the player tracking server 420 as the indication of the base wagering game activity. Similar to the interface units shown in FIG. 1, in some embodiments, the interface unit 465 and/or the interface unit 455 can be implemented in hardware and software in an interface board within the wagering game machine 460 and/or the wagering game controller 450, respectively. In some example systems, the interface board of the wagering game machine 460 may be referred to as the slot machine interface board (SMIB). In some embodiments, the interface unit 465 and/or the interface unit 455 can be implemented in software within the wagering game machine 460 and/or the wagering game controller 450, respectively.

In some embodiments, since both the wagering game controller 450 and each of the interface units 465 of the wagering game machines 460 report secondary wagering game activity to the accounting server 410, the secondary wagering game activity of players may be double counted at the accounting server 410 for accounting purposes, unless one of the secondary wagering game activity records is backed out. For example, the operator of the wagering game system 400 can manually back out (i.e., subtract) one of the secondary wagering game activity records it receives. In another example, the accounting server 410 can be configured to automatically back out one of the secondary wagering game activity records it receives.

The wagering game machines 460 described herein can take any suitable form, such as floor standing models, hand-held mobile units, bar-top models, workstation-type console models, surface computing machines, etc., and can access the communication network 415 to communication with the wagering game controller 450 via a wireless or wired connection. In some embodiments, each of the wagering game machines 460 and the wagering game controller 450 are configured to work together such that the wagering game machine 460 can be operated as a thin, thick, or intermediate client. For example, one or more elements of game play may be controlled by the wagering game machine 460 (client) or the wagering game controller 450 (server). Game play elements can include executable game code, lookup tables, configuration files, game results, audio or visual representations of the game, game assets or the like. In a thin-client example, the wagering game controller 450 can perform functions such as determining game results or managing assets, while the wagering game machine 460 can present an audible/graphical representation of such outcome or asset modification to the players. In a thick-client example, the wagering game machine 460 can run the wagering games and determine game outcomes and communicate wagering game activity to the wagering game controller 450, the accounting server 410, and/or the player tracking server 420 for recording or managing a player's wagering game system account, player tracking, various accounting operations, etc.

The wagering game controller 450 is configured to perform various operations for the wagering game system 400. For example, the wagering game controller 450 can include a base wagering game server 451 for storing base wagering game content, providing base wagering game updates to the wagering game machines 460, and providing new base wagering games to the wagering game machines 460. In some implementations, the base wagering game server 451 can also generate random numbers and provide the random numbers to the wagering game machines 460 so that the wagering game machines can determine game results for base wagering games. The wagering game controller 450 can also include a secondary game server 452 configured to run secondary wagering games, and work in conjunction with the game management unit 462 of the wagering game machines 460 to present the secondary wagering games in one or more displays of the wagering game machines 460. For example, the secondary game server 452 can receive bonus trigger notification messages from the wagering game machines 460 that indicate that a bonus game should be presented at the corresponding wagering game machines 460. The secondary game server 452 may also be configured to create and manage systemwide, cumulative secondary wagering game activity records based on secondary wagering game activity messages received from the game management unit 462 of the wagering game machines 460, and provide the cumulative records to the accounting server 410 for accounting purposes. For example, the secondary game server 452 can maintain secondary game meters to track the secondary wagering game activity. The wagering game controller 450 can also include an interface unit 455 configured to forward the systemwide, cumulative secondary wagering game activity records directly to the accounting server 410. In some system implementations, the accounting server 410 and the player tracking server 420 may implement a proprietary protocol, and therefore the interface units 465 of the wagering game machines 460 and the interface unit 455 of the wagering game controller 450 can also perform the necessary protocol conversions to enable the network communications between the different network entities. It is noted that although FIG. 4 (and some of the examples described herein and in the additional Figures below) may imply that some network connections are wired, in some embodiments some or all of the network connections between the different entities of the wagering game system 400 may be implemented wirelessly.

Each component shown in the wagering game system architecture 400 is shown as a separate and distinct element connected via the communications network 415. However, some functions performed by one component could be performed by other components. For example, the base wagering game server 451 can be configured to perform some or all of the functions of the secondary game server 452. Furthermore, the components shown may all be contained in one device, but some, or all, may be included in, or performed by multiple devices, as in the configurations shown in FIG. 4 or other configurations not shown, e.g., the accounting server 410 and the player tracking server 420 may be implemented within a single server system. Furthermore, the wagering game system architecture 400 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game table, machine, computer, etc.). For example, tangible machine-readable storage media includes read only memory (ROM), random access memory (RAM), magnetic disk storage media, optical storage media, flash memory machines, and other types of tangible medium suitable for storing instructions. Machine-readable transmission media includes any media suitable for transmitting software over a network.

Although FIG. 4 describes some embodiments, the following sections describe many other features and embodiments.

Additional Example Operations

This section describes additional operations associated with some embodiments. In the discussion below, the flow diagrams will be described with reference to the block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
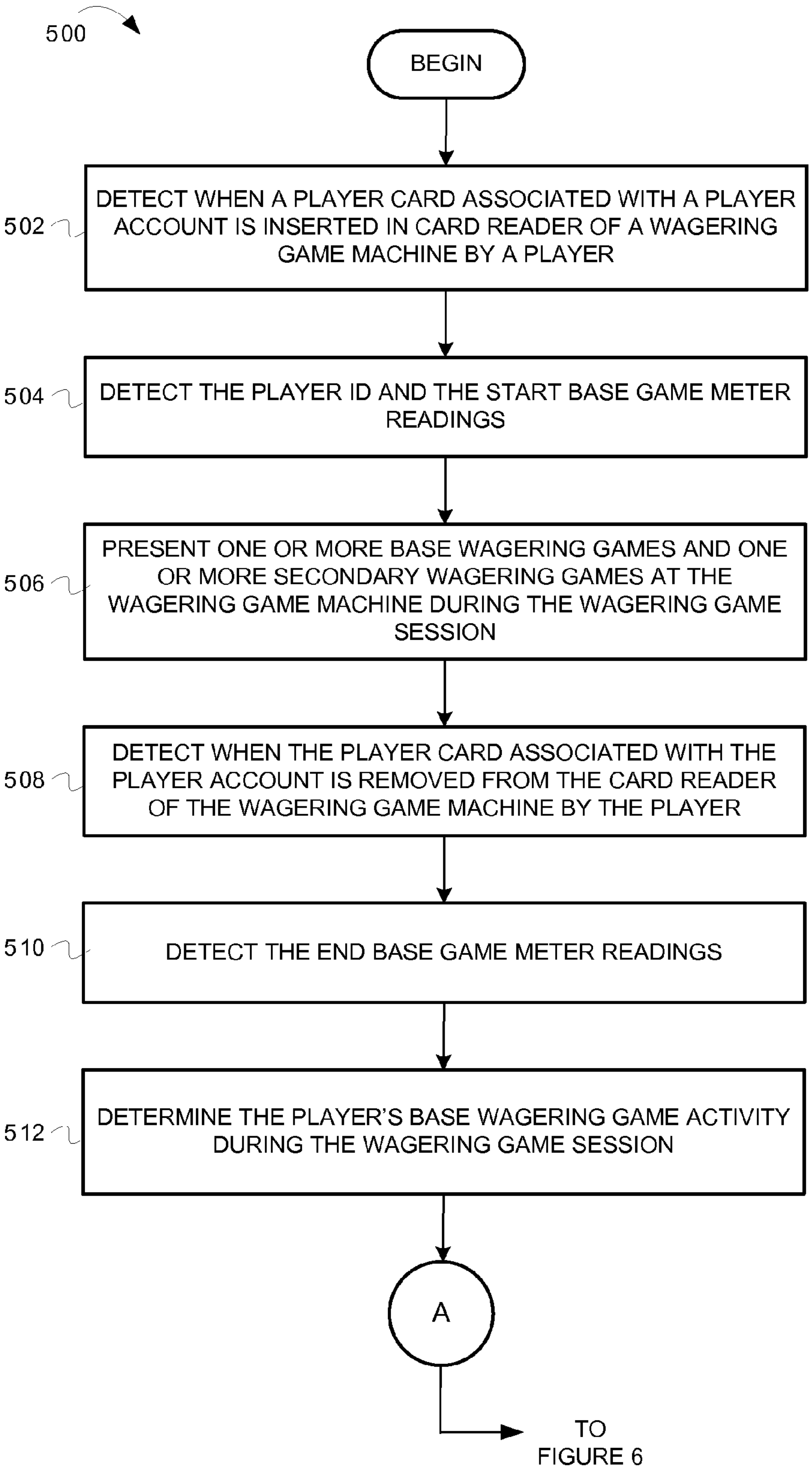
FIG. 5 is a flow diagram illustrating operations for implementing player tracking for secondary wagering games in a wagering game system, according to some embodiments.
Figure 6:
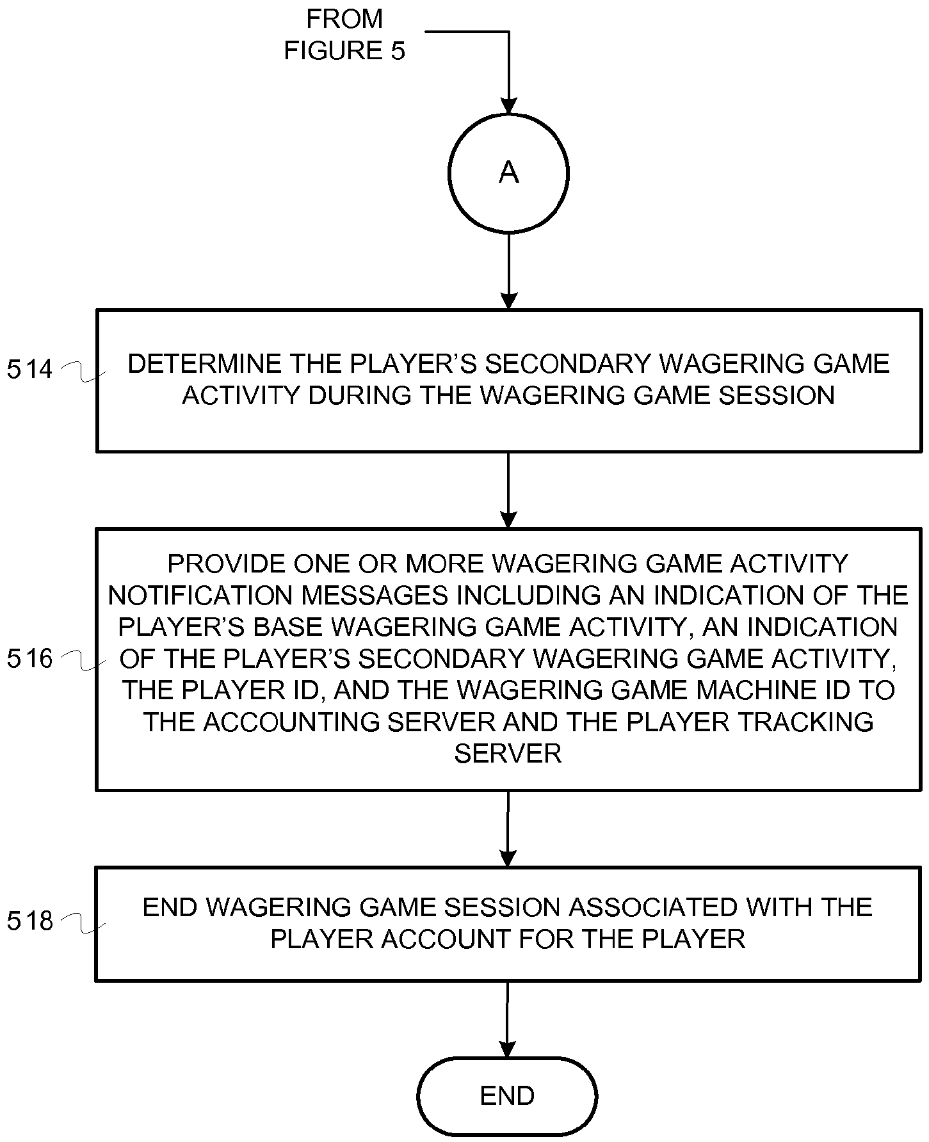
FIG. 6 is a flow diagram illustrating additional example operations for implementing player tracking for secondary wagering games in a wagering game system, according to some embodiments.

The following discussion of FIGS. 5-6 will describe additional examples of player tracking of secondary wagering game activity at the wagering game machines without the use of the player tracking unit (shown in FIG. 1).

FIG. 5 is a flow diagram 500 illustrating operations for implementing player tracking for secondary wagering games in a wagering game system, according to some embodiments. The flow of 500 will be described with reference to the example system architecture of FIG. 4. The flow diagram begins at block 502.

At block 502, a wagering game machine 460 detects when a player card associated with a player account is inserted into a player card reader 464 of the wagering game machine 460 by a player. In one implementation, the player card reader 464 can detect the player card and read the player card ID. The player card reader 464 can then verify that the player card ID is compatible or supported by the wagering game system 400. It is noted, however, that in some embodiments the player card ID, or another player identification number ("player ID") associated with the player account of the player, can be determined depending on the method the player uses to login to the wagering game machine 460. For example, as was described above with reference to FIG. 2, the player can login to the wagering game machine 460 using a username and password, using biometrics, etc. Regardless of the manner the player uses to login, the wagering game machine 460 can detect a player ID associated with the player account of the player. In some cases, the player ID may be the player account number, or the player card ID. After block 502, the flow continues at block 504.

At block 504, the wagering game machine 460 determines the player ID associated with the player account, and the start base game meter readings. In one implementation, the interface unit 465 can obtain the player ID from the player card reader 464, and the start base game meter readings from the game management unit 462. Similarly as described above with reference to FIG. 1, the base game management unit 462 can implement base game meters to track the base wagering game activity (e.g., wagers and wins) during each wagering game session. After block 504, the flow continues at block 506.

At block 506, the wagering game machine 560 presents one or more base wagering games and one or more secondary wagering games during the wagering game session. In some implementations, during the wagering game session, the game management unit 462 updates the base game meters based on the base wagering game activity (e.g., the wagers and wins associated with the base wagering games), similarly as was described above with reference to FIG. 1. In some implementations, the game management unit 462 may also provide an indication of the wagers the player places for secondary wagering games and an indication of the secondary wagering game wins to the interface unit 465. The interface unit 465 may use base game meter readings and the secondary wagering game information to track and determine both the player's base and secondary wagering game activity during the wagering game session, as will be further described below. In some implementations, the game management unit 462 also provides an indication of the wagers the player places for the secondary wagering games and the wagering game machine ID to the wagering game controller 450. After block 506, the flow continues at block 508.

At block 508, the wagering game machine 460 detects when the player card associated with the player account is removed from the player card reader 464 of the wagering game machine 460 by the player. As described above, the player can login to the wagering game machine 460 by various methods that do not involve a player card. For example, the player can logout from the wagering game machine 460 by clicking an icon on a graphical user interface, by pressing a physical button on a panel of the wagering game machine 460, based on machine vision, etc. Regardless of the manner the player logs out, the wagering game machine 460 can detect that the player associated with the player ID has logged out from the wagering game machine 460. After block 508, the flow continues at block 510.

At block 510, the wagering game machine 460 can detect the end (or card-out) base game meter readings. In one implementation, the interface unit 465 can detect the end base game meter readings from the game management unit 462. The game management unit 462 manages and updates the base game meter readings based on the wagers and wins associated with the base wagering games that are played during the wagering game session. After block 510, the flow continues at block 512.

At block 512, the wagering game machine 460 determines the player's base wagering game activity during the wagering game session. In one implementation, in response to the interface unit 465 detecting the end base game meter readings from the game management unit 462, the interface unit 465 calculates the difference between the start and end base game meter readings to determine the player's base wagering game activity during the wagering game session. For example, the interface unit 465 can calculate the difference between the start and end base game wager meter readings and the difference between the start and end base game win meter readings to determine the player's base wagering game activity during the wagering game session. In other words, the interface unit 465 can determine the total amount wagered and the total amount won for base wagering games during the wagering game session. It is noted, however, that in some implementations the interface unit 465 can provide the start and end base game meter readings to the player tracking server 420 (e.g., via the accounting server 410). After block 512, the flow continues at block 514.

FIG. 6 is a flow diagram illustrating additional example operations for implementing player tracking for secondary wagering games in a wagering game system, according to some embodiments. The flow diagram of FIG. 6 is a continuation of the flow diagram shown in FIG. 5, and begins at block 514.

At block 514, the wagering game machine 460 determines the player's secondary wagering game activity during the wagering game session. In some implementations, in addition to detecting wagers and wins associated with the base wagering games, the game management unit 462 may also detect wagers and wins associated with the secondary wagering games that are played during the wagering game session. The game management unit 462 may be configured to provide an indication of the wagers the player places for secondary wagering games and an indication of the player's secondary wagering game wins to the interface unit 465. In some implementations, the game management unit 462 may or may not know that the additional wagers and wins that it detects (which are not for base wagering games) are for secondary wagering games, but the game management unit 462 may be configured to provide an indication of these additional wagers and wins to the interface unit 465. For example, the game management unit 462 can detect a total wager of $1.25. Out of that $1.25 total wager, the game management unit 462 can detect that a $1 wager should be ascribed to the base wagering game and that a $0.25 wager should be ascribed to something else (e.g., secondary wagering games). The game management unit 462 can then provide an indication of the $0.25 wager to the wagering game controller 450 (for accounting purposes), and also provide an indication of the $0.25 wager to the interface unit 465 (for player tracking purposes). The interface unit 465 may then determine the player's secondary wagering game activity during the wagering game server based on the wager and win information received from the game management unit 462. After block 514, the flow continues at block 516.

At block 516, the interface unit 465 can provide one or more wagering game activity notification messages including an indication of the player's base wagering game activity, an indication of the player's secondary wagering game activity, the player ID, and the wagering game machine ID to the player tracking server 420 and the accounting server 410. In one implementation, the interface unit 465 can provide a single wagering game activity notification message that includes both the indication of the player's base wagering game activity and the indication of the player's secondary wagering game activity (in addition to the player ID and the wagering game machine ID). In another implementation, the interface unit 465 can provide separate game activity notification messages for the base wagering game activity and secondary wagering game activity. In response to the player tracking server 420 receiving the secondary wagering game activity message, the player tracking server 420 can then determine how many player tracking points to award the player account based on the player's secondary wagering game activity during the wagering game session.

Similarly as was described above in FIG. 1, in some embodiments, the wagering game controller 450 can provide systemwide, cumulative secondary wagering game activity records to the accounting server 410. The systemwide, cumulative secondary wagering game activity records may be assembled based on all the secondary wagering game activity the wagering game machines 460 report to the wagering game controller 450. However, as was described above, the systemwide, cumulative secondary wagering game activity may be use for systemwide or per machine accounting, and each individual player's secondary wagering game activity may not be derived from this cumulative information.

In some embodiments, since both the wagering game controller 450 and each of the interface units 465 of the wagering game machines 460 report secondary wagering game activity to the accounting server 410, the secondary wagering game activity of players may be double counted at the accounting server 410 for accounting purposes, unless one of the secondary wagering game activity records is backed out. For example, the operator of the wagering game system 400 can manually back out (i.e., subtract) one of the secondary wagering game activity records it receives. In another example, the accounting server 410 can be configured to automatically back out one of the secondary wagering game activity records it receives. After block 516, the flow continues at block 518.

At block 518, the wagering game machine 460 ends the wagering game session associated with the player account for the player. After block 518, the flow ends.

In some embodiments, for the base wagering game activity, instead of providing the base wagering game activity report to the accounting server 410 and the player tracking server 420, the interface unit 465 can provide base game card-in/card-out notification messages (including the player ID, timestamps, wagering game ID, and start/end base game meter readings), similarly as was described above with reference to FIG. 1. In these embodiments, the interface unit 465 can send the indication of the player's secondary wagering game activity when the interface unit 465 sends the base game card-out notification message.

Additional Example Operating Environments

This section describes example operating environments, systems and networks, and presents structural aspects of some embodiments.

Wagering Game Machine Architectures

Figure 7:
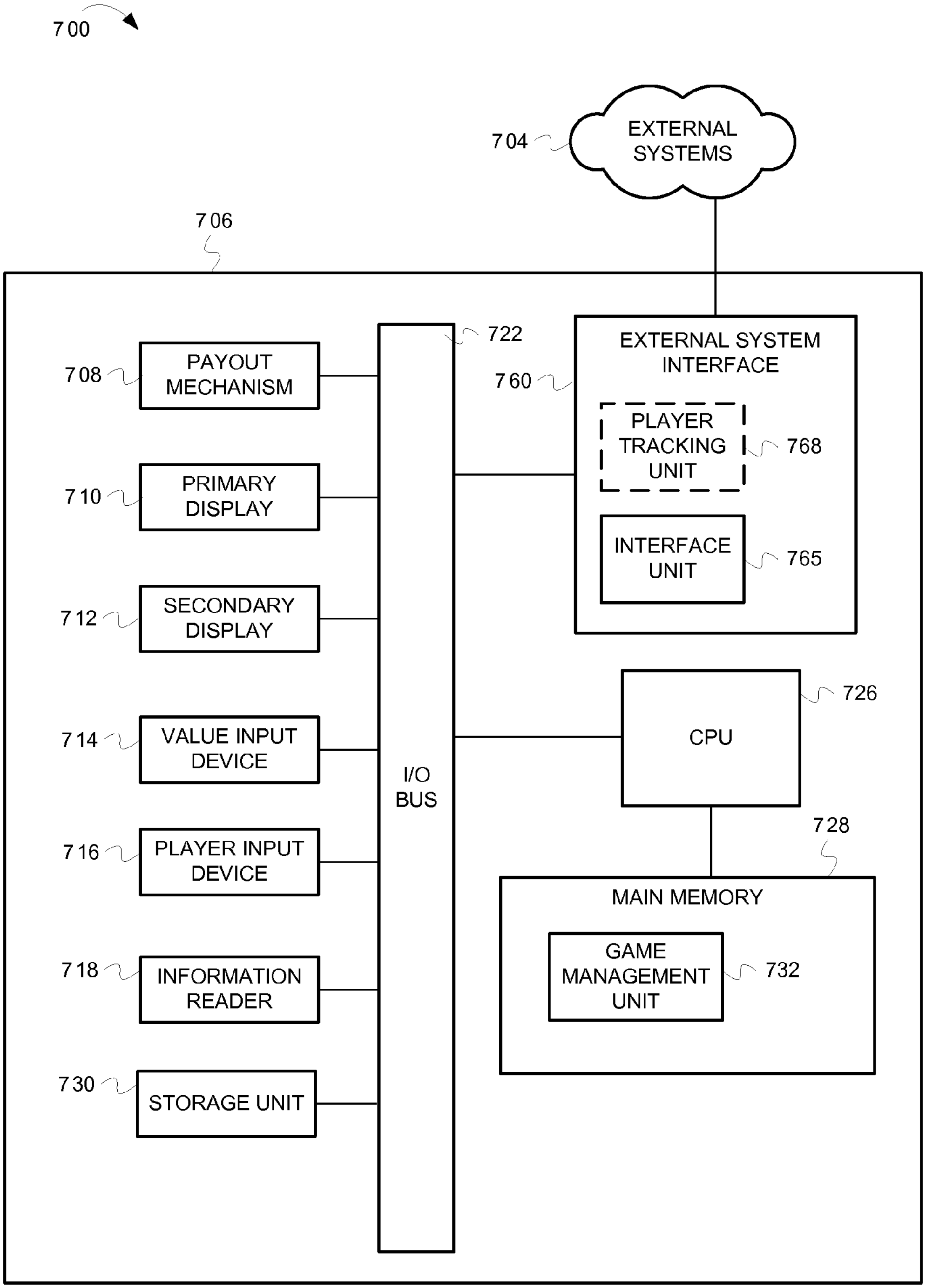
FIG. 7 is a conceptual diagram that illustrates an example of a wagering game machine architecture, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a game management unit 732. In some embodiments, the game management unit 732 can present wagering games, such as video poker, video black jack, video slots, video lottery, reel slots, etc., in whole or part.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems (e.g., wagering game networks). The external system interface 760 can include logic for exchanging information over wired and wireless networks (e.g., 802.11g transceiver, Bluetooth transceiver, Ethernet transceiver, etc.) In some embodiments, the external system interface 760 can include an interface unit 765 and a player tracking unit 768 that are configured to work in conjunction with the CPU 726 and the game management unit 732 to implement techniques for player tracking of secondary wagering game activity, as was described above with reference to FIGS. 1-3. In other embodiments, the external system interface 760 can include the interface unit 765 (and not the player tracking unit 768) that is configured to work in conjunction with the CPU 726 and the game management unit 732 to implement techniques for player tracking of secondary wagering game activity, as was described above with reference to FIGS. 4-6.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

Furthermore, any component of the wagering game machine 706 can include hardware, firmware, and/or machine-readable storage media including instructions for performing the operations described herein.

Example Wagering Game Machines

Figure 8:
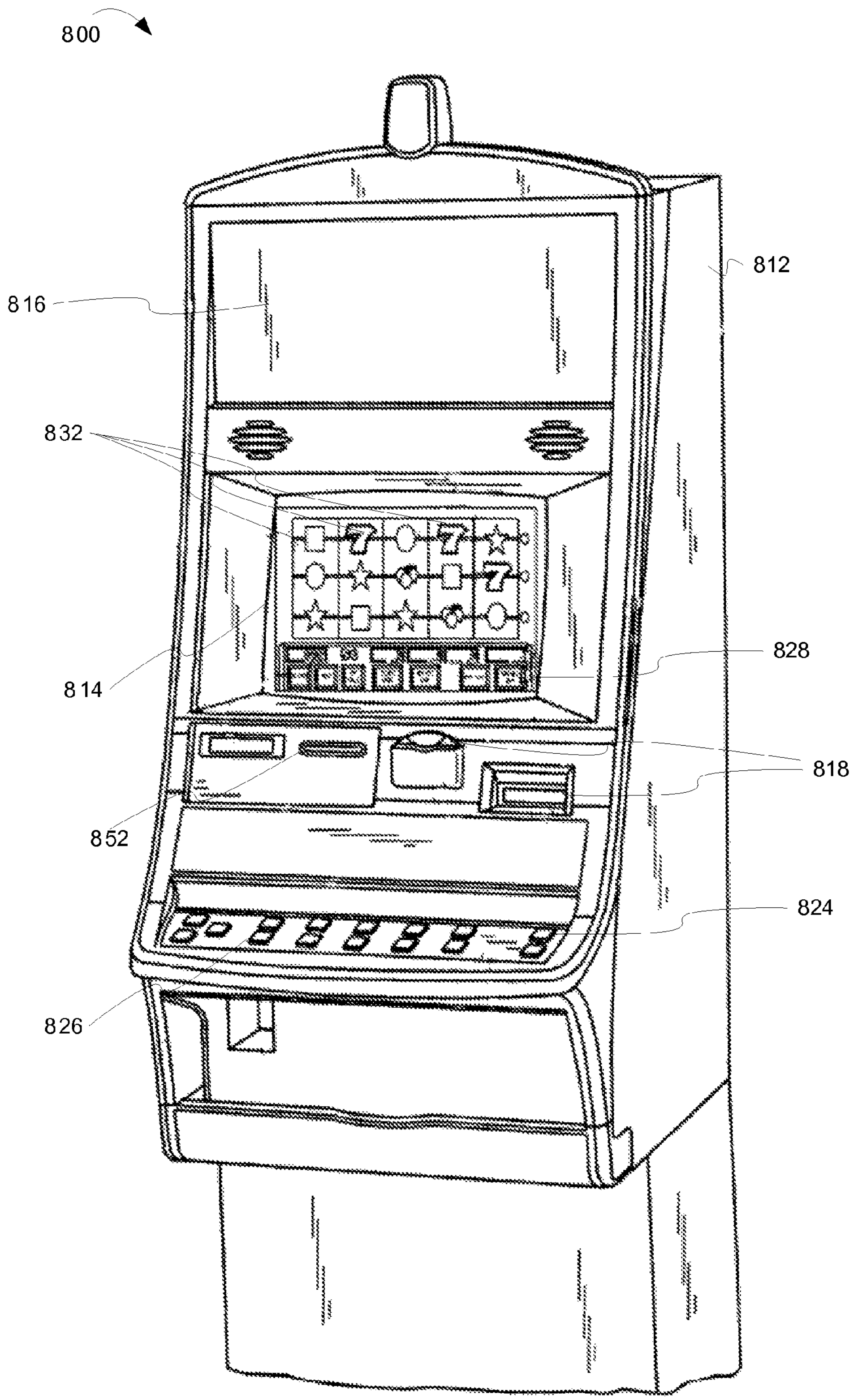
FIG. 8 is a perspective view of a wagering game machine, according to example embodiments.

FIG. 8 is a perspective view of a wagering game machine, according to example embodiments. Referring to FIG. 8, a wagering game machine 800 is used in gaming establishments, such as casinos. In some embodiments, the wagering game machine 800 can implement at least part of the functionality described above with reference to FIGS. 1-7, e.g., for player tracking of secondary wagering game activity.

According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. In some implementations, the primary display 814 can also display information about a bonus wagering game and a progressive wagering game. The wagering game machine 800 also includes a secondary display 816 for displaying bonus wagering games, wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the inventive subject matter, which are defined only by the appended claims. Each of the embodiments described herein are contemplated as falling within the inventive subject matter, which is set forth in the following claims.

The invention claimed is:

1. A computer-implemented method comprising:

determining, at a wagering game machine of a wagering game system, to initiate a wagering game session for a player account associated with a player in response to detecting a login indication including a player identifier associated with the player account;

presenting one or more base wagering games and one or more secondary wagering games at the wagering game machine during the wagering game session associated with the player account;

monitoring, at the wagering game machine, base wagering game activity associated with the one or more base wagering games that are presented during the wagering game session;

generating and transmitting one or more activity notification messages comprising at least an indication of the base wagering game activity associated with the one or more base wagering games presented during the wagering game session, the player identifier, and a wagering game machine identifier associated with the wagering game machine to a player tracking server of the wagering game system to cause the player tracking server to reward the base wagering game activity associated with the player account; and generating and transmitting login and logout notification messages comprising at least a timestamp, the player identifier, and the wagering game machine identifier to a secondary game server of the wagering game system to cause the secondary game server to determine secondary wagering game activity associated with the one or more secondary wagering games presented during the wagering game session, wherein the secondary wagering game activity is to be used by the player tracking server to reward the secondary wagering game activity associated with the player account.

2. The method of claim 1, wherein said monitoring the base wagering game activity associated with the one or more base wagering games that are presented during the wagering game session, and said determining and transmitting one or more activity notification messages to the player tracking server comprise:

in response to detecting the login indication, determining login base game meter readings associated with base game meters that track the base wagering game activity at the wagering game machine associated with the player account;

generating and transmitting a base game login notification message comprising at least the login base game meter readings, a login timestamp, the player identifier, and the wagering game machine identifier to the player tracking server;

in response to detecting a logout indication, determining logout base game meter readings associated with the base game meters; and generating and transmitting a base game logout notification message comprising at least the logout base game meter readings, a logout timestamp, the player identifier, and the wagering game machine identifier to the player tracking server to cause the player tracking server to reward the base wagering game activity associated with the player account.

3. The method of claim 2, wherein said generating and transmitting the login and logout notification messages to the secondary game server comprises:

in response to detecting the base game login notification message, generating and transmitting a secondary game login notification message comprising at least the login timestamp, the player identifier, and the wagering game machine identifier to the secondary game server; and in response to detecting the base game logout notification message, generating and transmitting a secondary game logout notification message comprising at least the logout timestamp, the player identifier, and the wagering game machine identifier to the secondary game server to cause the secondary game server to determine secondary wagering game activity associated with the one or more secondary wagering games presented during the wagering game session, wherein the secondary wagering game activity is to be used by the player tracking server to reward the secondary wagering game activity associated with the player account.

4. The method of claim 1, wherein the base wagering game activity comprises wagers and wins associated with the one or more base wagering games that are presented during the wagering game session, and the secondary wagering game activity comprises wagers and wins associated with the one or more secondary wagering games that are presented during the wagering game session.

5. The method of claim 1, wherein said monitoring the base wagering game activity associated with the one or more base wagering games that are presented during the wagering game session, and said generating and transmitting one or more activity notification messages to the player tracking server comprise:

in response to detecting the login indication, determining login base game meter readings associated with base game meters that track the base wagering game activity at the wagering game machine associated with the player account;

in response to detecting a logout indication, determining logout base game meter readings associated with the base game meters;

determining the base wagering game activity associated with the player account based on a difference between the login base game meter readings and the logout base game meter readings of the base game meters; and generating and transmitting a base wagering game activity notification message comprising at least an indication of the base wagering game activity, the player identifier, and the wagering game machine identifier to the player tracking server to cause the player tracking server to reward the base wagering game activity associated with the player account.

6. The method of claim 1, wherein said detecting the login indication including the player identifier associated with the player account comprises detecting an indication from a card reader of the wagering game machine indicating that a player card has been inserted into the card reader and detecting the player identifier associated with the player from the player card.

7. A wagering game machine comprising:

a game management unit configured to determine to initiate a wagering game session for a player account associated with a player in response to detecting a login indication including a player identifier associated with the player account;

an interface unit configured, in response to detecting the login indication, to determine login base game meter readings associated with base game meters used to track base wagering game activity associated with one or more base wagering games that are presented during the wagering game session, and configured to, generate and transmit a base game login notification message comprising at least the login base game meter readings, a login timestamp, the player identifier, and a wagering game machine identifier associated with the wagering game machine to a player tracking server;

in response to detecting a logout indication to end the wagering game session, determine logout base game meter readings associated with the base game meters; and generate and transmit a base game logout notification message comprising at least the logout base game meter readings, a logout timestamp, the player identifier, and the wagering game machine identifier to the player tracking server to cause the player tracking server to determine and reward the base wagering game activity during the wagering game session associated with the player account; and a player tracking unit configured to detect the base game login notification message and the base game logout notification message from the interface unit, and configured to, in response to the player tracking unit detecting the base game login notification message, generate and transmit a secondary game login notification message comprising at least the login timestamp, the player identifier, and the wagering game machine identifier to a secondary game server; and in response to the player tracking unit detecting the base game logout notification message, generate and transmit a secondary game logout notification message comprising at least the logout timestamp, the player identifier, and the wagering game machine identifier to the secondary game server to cause the secondary game server to determine secondary wagering game activity associated with one or more secondary wagering games presented during the wagering game session, wherein the secondary wagering game activity is to be used by the player tracking server to reward the secondary wagering game activity associated with the player account.

8. The wagering game machine of claim 7, wherein the base wagering game activity comprises wagers and wins associated with the one or more base wagering games that are presented during the wagering game session, and the secondary wagering game activity comprises wagers and wins associated with the one or more secondary wagering games that are presented during the wagering game session.

9. The wagering game machine of claim 7, wherein the game management unit configured to determine to initiate the wagering game session for the player account associated with the player in response to detecting the login indication including the player identifier associated with the player account comprises the game management unit configured to determine to initiate the wagering game session for the player account associated with the player in response to detecting an indication from a card reader of the wagering game machine indicating that a player card has been inserted into the card reader and detecting the player identifier associated with the player from the player card.

10. The wagering game machine of claim 7, wherein the interface unit comprises an interface circuit board and the player tracking unit comprises a player tracking circuit board, wherein the player tracking circuit board is coupled to a housing of the wagering game machine and also coupled to the interface circuit board.

11. The wagering game machine of claim 7, wherein each of the interface unit and the player tracking unit are implemented in software and/or hardware within one or more circuit boards associated with the game management unit.

12. One or more non-transitory machine-readable storage media, having instructions stored therein, which, when executed by one or more processors causes the one or more processors to perform operations that comprise:

determining, at a wagering game machine of a wagering game system, to initiate a wagering game session for a player account associated with a player in response to detecting a login indication including a player identifier associated with the player account;

presenting one or more base wagering games and one or more secondary wagering games at the wagering game machine during the wagering game session associated with the player account;

monitoring, at the wagering game machine, base wagering game activity associated with the one or more base wagering games that are presented during the wagering game session;

generating and transmitting one or more activity notification messages comprising at least an indication of the base wagering game activity associated with the one or more base wagering games presented during the wagering game session, the player identifier, and a wagering game machine identifier associated with the wagering game machine to a player tracking server of the wagering game system to cause the player tracking server to reward the base wagering game activity associated with the player account; and generating and transmitting login and logout notification messages comprising at least a timestamp, the player identifier, and the wagering game machine identifier to a secondary game server of the wagering game system to cause the secondary game server to determine secondary wagering game activity associated with the one or more secondary wagering games presented during the wagering game session, wherein the secondary wagering game activity is to be used by the player tracking server to reward the secondary wagering game activity associated with the player account.

13. The non-transitory machine-readable storage media of claim 12, wherein said operation of monitoring the base wagering game activity associated with the one or more base wagering games that are presented during the wagering game session, and said operation of generating and transmitting one or more activity notification messages to the player tracking server comprise:

in response to detecting the login indication, determining login base game meter readings associated with base game meters that track the base wagering game activity at the wagering game machine associated with the player account;

generating and transmitting a base game login notification message comprising at least the login base game meter readings, a login timestamp, the player identifier, and the wagering game machine identifier to the player tracking server;

in response to detecting a logout indication, determining logout base game meter readings associated with the base game meters; and generating and transmitting a base game logout notification message comprising at least the logout base game meter readings, a logout timestamp, the player identifier, and the wagering game machine identifier to the player tracking server to cause the player tracking server to reward the base wagering game activity associated with the player account.

14. The non-transitory machine-readable storage media of claim 13, wherein said operation of generating and transmitting the login and logout notification messages to the secondary game server comprises:

in response to detecting the base game login notification message, generating and transmitting a secondary game login notification message comprising at least the login timestamp, the player identifier, and the wagering game machine identifier to the secondary game server; and in response to detecting the base game logout notification message, generating and transmitting a secondary game logout notification message comprising at least the logout timestamp, the player identifier, and the wagering game machine identifier to the secondary game server to cause the secondary game server to determine secondary wagering game activity associated with the one or more secondary wagering games presented during the wagering game session, wherein the secondary wagering game activity is to be used by the player tracking server to reward the secondary wagering game activity associated with the player account.

15. The non-transitory machine-readable storage media of claim 12, wherein said operation of monitoring the base wagering game activity associated with the one or more base wagering games that are presented during the wagering game session, and said operation of generating and transmitting one or more activity notification messages to the player tracking server comprise:

in response to detecting the login indication, determining login base game meter readings associated with base game meters that track the base wagering game activity at the wagering game machine associated with the player account;

in response to detecting a logout indication, determining logout base game meter readings associated with the base game meters;

determining the base wagering game activity associated with the player account based on a difference between the login base game meter readings and the logout base game meter readings of the base game meters; and generating and transmitting a base wagering game activity notification message comprising at least an indication of the base wagering game activity, the player identifier, and the wagering game machine identifier to the player tracking server to cause the player tracking server to reward the base wagering game activity associated with the player account.

16. The non-transitory machine-readable storage media of claim 12, wherein said operation of detecting the login indication including the player identifier associated with the player account comprises detecting an indication from a card reader of the wagering game machine indicating that a player card has been inserted into the card reader and detecting the player identifier associated with the player from the player card.

17. A wagering game machine comprising:

means for determining to initiate a wagering game session for a player account associated with a player in response to detecting a login indication including a player identifier associated with the player account;

means for presenting one or more base wagering games and one or more secondary wagering games at the wagering game machine during the wagering game session associated with the player account;

means for monitoring base wagering game activity associated with the one or more base wagering games that are presented during the wagering game session;

means for generating and transmitting one or more activity notification messages comprising at least an indication of the base wagering game activity associated with the one or more base wagering games presented during the wagering game session, the player identifier, and a wagering game machine identifier associated with the wagering game machine to a player tracking server of the wagering game system to cause the player tracking server to reward the base wagering game activity associated with the player account; and means for generating and transmitting login and logout notification messages comprising at least a timestamp, the player identifier, and the wagering game machine identifier to a secondary game server of the wagering game system to cause the secondary game server to determine secondary wagering game activity associated with the one or more secondary wagering games presented during the wagering game session, wherein the secondary wagering game activity is to be used by the player tracking server to reward the secondary wagering game activity associated with the player account.

18. The wagering game machine of claim 17, wherein said means for monitoring the base wagering game activity associated with the one or more base wagering games that are presented during the wagering game session, and said means for generating and transmitting one or more activity notification messages to the player tracking server comprise:

in response to detecting the login indication, means for determining login base game meter readings associated with base game meters that track the base wagering game activity at the wagering game machine associated with the player account;

means for generating and transmitting a base game login notification message comprising at least the login base game meter readings, a login timestamp, the player identifier, and the wagering game machine identifier to the player tracking server;

in response to detecting a logout indication, means for determining logout base game meter readings associated with the base game meters; and means for generating and transmitting a base game logout notification message comprising at least the logout base game meter readings, a logout timestamp, the player identifier, and the wagering game machine identifier to the player tracking server to cause the player tracking server to reward the base wagering game activity associated with the player account.

19. The wagering game machine of claim 18, wherein said means for generating and transmitting the login and logout notification messages to the secondary game server comprises:

in response to detecting the base game login notification message, means for generating and transmitting a secondary game login notification message comprising at least the login timestamp, the player identifier, and the wagering game machine identifier to the secondary game server; and in response to detecting the base game logout notification message, means for generating and transmitting a secondary game logout notification message comprising at least the logout timestamp, the player identifier, and the wagering game machine identifier to the secondary game server to cause the secondary game server to determine secondary wagering game activity associated with the one or more secondary wagering games presented during the wagering game session, wherein the secondary wagering game activity is to be used by the player tracking server to reward the secondary wagering game activity associated with the player account.

20. The wagering game machine of claim 17, wherein said means for monitoring the base wagering game activity associated with the one or more base wagering games that are presented during the wagering game session, and said means for generating and transmitting one or more activity notification messages to the player tracking server comprise:

in response to detecting the login indication, means for determining login base game meter readings associated with base game meters that track the base wagering game activity at the wagering game machine associated with the player account;

in response to detecting a logout indication, means for determining logout base game meter readings associated with the base game meters;

means for determining the base wagering game activity associated with the player account based on a difference between the login base game meter readings and the logout base game meter readings of the base game meters; and means for generating and transmitting a base wagering game activity notification message comprising at least an indication of the base wagering game activity, the player identifier, and the wagering game machine identifier to the player tracking server to cause the player tracking server to reward the base wagering game activity associated with the player account.

* * * * *